United States Patent [19]

Klann

[11] 4,159,872
[45] Jul. 3, 1979

[54] OPTICAL DISTORTION DEVICE

[76] Inventor: Paul A. Klann, P.O. Box 2398, Waynesboro, Va. 22980

[21] Appl. No.: 855,640

[22] Filed: Nov. 29, 1977

[51] Int. Cl.² ............................................. G03B 27/20
[52] U.S. Cl. ........................................ 355/91; 226/95; 355/108
[58] Field of Search ................... 355/84, 91, 103, 108; 271/276, 94, 172, 196; 226/95

[56] References Cited

U.S. PATENT DOCUMENTS

| | | | |
|---|---|---|---|
| 3,122,295 | 2/1964 | Davison et al. | 226/95 X |
| 3,161,120 | 12/1964 | Timares et al. | 355/103 X |
| 3,545,746 | 12/1970 | Ledger et al. | 271/196 |
| 3,778,155 | 12/1973 | Leavitt | 226/95 X |

*Primary Examiner*—Richard A. Wintercorn
*Attorney, Agent, or Firm*—Sughrue, Rothwell, Mion, Zinn and Macpeak

[57] ABSTRACT

An optical distortion device which can make a contact copy of a photographic film image with one dimension of the copy lengthened or shortened while the perpendicular dimension is unchanged is comprised of a pair of cylindrical motor driven rollers, at least one of which can be driven at a very low speed. The axes of the rollers are disposed parallel to each other and to a narrow slit through which a beam of light is directed. A copy sheet such as a photographic negative and a sheet of photosensitive material are pressed into intimate contact as they pass over the slit by a jet of positive air pressure and each sheet is held to the circumference of a respective roller by negative air pressure selectively supplied to a plurality of grooves in the surface of the roller. By varying the speed of one roller so that its rotation will be greater than, equal to or less than the rate of rotation of the other roller the dimensions of the image in the direction of movement can be made greater than, equal to or less than the dimension of the original in the direction of movement. An elongated light source is disposed beneath the narrow slit and a system of baffles and interchangeable light apertures are interposed beneath the slit and the light source to accurately collimate the light beam.

11 Claims, 11 Drawing Figures

OPTICAL DISTORTION DEVICE

BACKGROUND OF THE INVENTION

1. Field of the Invention

The present invention is directed to an optical distortion device and more specifically to a mechanical apparatus for making a contact copy of a photographic film image with one dimension of the copy lengthened or shortened while the perpendicular dimension is unchanged.

2. Prior Art

Optical or photographic distortion devices are old and well known in the art and perhaps the best known of these involved the use of an anamorphic lens, that is, a lens which has a different magnification of the image in each of two perpendicular directions. The cost of such lenses is prohibitive for many small businesses and they do not provide any flexibility whatsoever. A different lens is required for each and every variation desired in the distortion process.

Other prior art photographic distortion devices mount the negative and the photosensitive sheet in a pair of frames which are supported for rectilinear movement past a light slit. Most of these devices utilize an extremely complex linkage for obtaining a differential rate of movement between the two frames as they pass over a light slit. Examples of such complex linkage arrangements are disclosed in U.S. Pat. No. 3,401,616 to Cross and U.S. Pat. No. 3,445,165 to Dubbs.

Still another prior art arrangement utilizes a belt for moving a photosensitive sheet over the surface of a table by a pulley arrangement. A conventional variably transparent positive is positioned stationarily and planarly adjacent to the photosensitive sheet between the sheet and a movable light housing which is mounted on parallel tracks. An example of this arrangement is shown in the U.S. Pat. No. 3,115,081 to Bruce.

The U.S. Pat. No. 3,967,898 to Klann discloses an optical distortion device wherein the photographic image sheet and the photosensitive sheet are secured to two parallel rollers by mechanical gripping means and are pressed into intimate engagement with a light slit by means of a weighted bar as they are advanced past the slit prior to being wound up on the rollers.

SUMMARY OF THE INVENTION

The present invention provides an optical distortion device which is extremely simple in construction as well as being flexible and economical in operation.

The present invention provides a unidirectional photographic distortion apparatus wherein a pair of motors, one of which is of the variable speed type, simultaneously pull a photographic image and a photosensitive sheet past a light slit in superimposed relation.

The present invention provides a unidirectional photographic distortion apparatus which is capable of continuous operation so that the photographic image sheet and the photosensitive sheet can be of unlimited length. This is accomplished by securing the sheets only temporarily to their respective rollers by means of internal vacuum means.

The present invention provides an optical distortion device having an improved arrangement for pressing the photographic image sheet and the photosensitive sheet into intimate engagement with each other and the light slit comprising positive air pressure means which are economically operated in conjunction with the vacuum source means for the feed rollers inasmuch as the exhause of the vacuum source means can be utilized as the positive pressure.

The present invention relies on an optical distortion device having an improved lighting arrangement for the exposure slit over which the photographic image sheet and the photosensitive sheet are passed. An elongated light source is provided beneath and parallel to the slit in spaced relation thereto. A plurality of transverse baffles are provided in closely spaced relation along the length of the elongated light source between the light source and the slit. Selectively replaceable or adjustable light slit means are also interposed between the exposure slit and the light source to further collimate the light.

The foregoing and other objects, features and advantages of the invention will be apparent from the following more particular description of a preferred embodiment of the device as illustrated in the accompanying drawings.

DETAILED DESCRIPTION OF THE INVENTION

Figure 1:
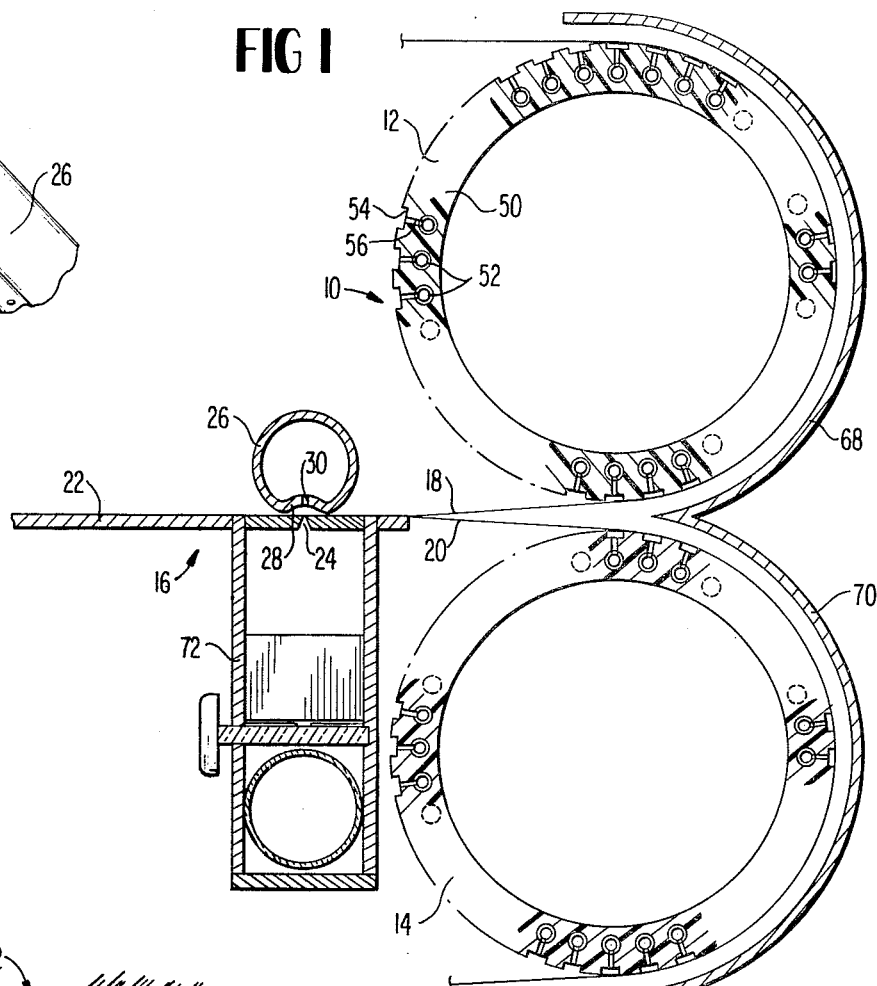
FIG. 1 is a partial side elevational view, partly in section, showing the feed roller and exposure arrangement of the present invention.

A preferred form of the optical distortion device according to the present invention is illustrated in FIG. 1. The optical distortion device 10 can be described as a continuous distortion device since the photosensitive sheet and the copy material in the form of a negative is limited in width only. The arrangement of the feed rollers 12 and 14 allow unlimited length of photosensitive sheet and copy to be passed over the exposure unit generally designated at 16.

Figure 2:
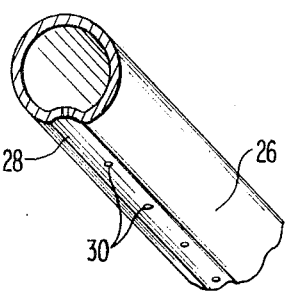
FIG. 2 is a partial perspective view of the air pressure hold-down tube.

The photosensitive sheet 18 and the copy material 20 which may be a photographic negative are placed in superimposed alignment with each other on the flat support surface 22. The photosensitive sheet and copy material should be provided with sufficient lead-in space so that the leading edges of both can be brought into overlapping relation with a portion of the circumference of each roller 12 and 14 with the actual material to be copied still disposed to the left of the light slit 24 as viewed in FIG. 1. An air pressure supply tube 26 is disposed in closely spaced relation to the upper surface of the support 22 directly above and parallel to the light slit 24. An air pressure supply source (not shown) is provided for supplying air under pressure to the interior of the tube 26. The tube is indented along the axis thereof to provide a groove 28 and a plurality of holes 30 communicate the bottom of the groove with the interior of the tube 26. Since the tube 26 is spaced from the support 22 by a distance only sufficient to allow the passage of photosensitive sheet and copy material therebetween, the positive air pressure supplied to the groove 28 through the apertures 30 will provide a hold-down force so that the photosensitive sheet and copy material will be pressed into intimate engagement with each other and the upper surface of the support 22 as the photosensitive sheet and copy material pass over the slight slit 24. The prespective view of the tubing is shown in FIG. 2 and one end of the tube 26 may be sealed and the other end thereof connected to the air pressure supply by any suitable means. The tube 26 may be mounted relative to the support 22 by any suitable means which may be adjustable to allow for variable spacing between the tube and support surface.

The feed rollers 12 and 14 are preferably constructed in the form of hollow cylindrical tubes in order to reduce the weight of the optical distortion device. The rollers 12 and 14 are closed at either end by end walls 34 and 36, respectively, which have stub shafts, one of which is shown at 38 for rotatably mounting the rollers in the housing 32 by means of bearings 40. Each roller is driven by a variable speed synchronous motor, one of which is shown at 42 in operative relation to the shaft 38 of the roller 12. The speed of the drive motors may be varied relative to each other to obtain the necessary distortion and one embodiment of a suitable motor control will be discussed hereinafter.

Figure 3:
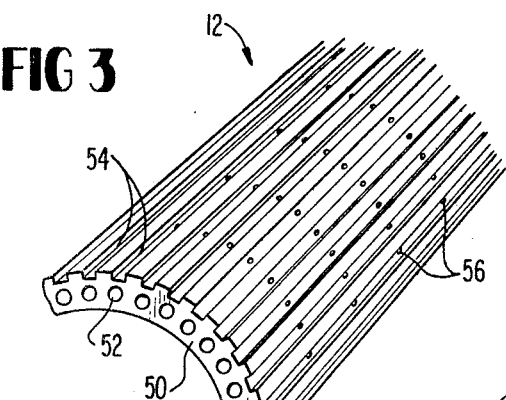
FIG. 3 is a partial perspective view showing the vacuum hold-down slots on the surface of a roller according to a first embodiment.
Figure 10:
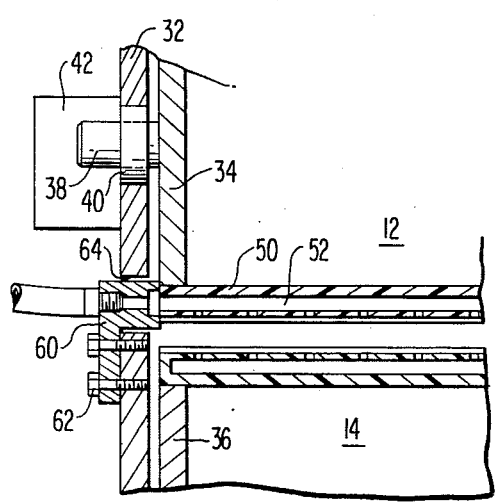
FIG. 10 is a sectional view taken along the line 10—10 of FIG. 9.
Figure 10:
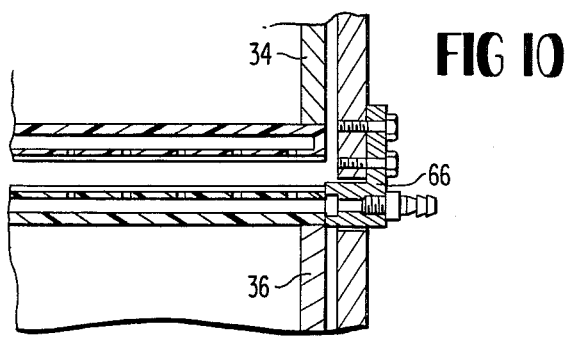

The two rollers 12 and 14 are identical in construction and accordingly a detailed description will be presented only with respect to roller 12. The cylindrical wall 50 of the roller and the end walls 34 may be made of plastic material which is light weight and easily machinable. A plurality of equally spaced parallel longitudinally extending bores 52 extend lengthwise of the cylindrical wall 50. The bores 52 are opened at one end and sealed at the opposite end as best seen in FIG. 10. According to a first embodiment as seen in FIG. 3, a plurality of longitudinally extending parallel grooves 54 are provided in the outer surface of the cylindrical wall 50 of the roller 12. Each groove 54 is disposed radially outwardly of a respective bore 52 and a plurality of radially extending passages communicate the interior of each bore 52 with the bottom of its respective groove 54. The grooves 54 extend from one end of the roller to the other and upon application of a vacuum to one or more bores 52, a partial vacuum will be created in the respective groove whereby the photosensitive sheet 18 will be held to the outer surface of the roller 12.

Figure 4:
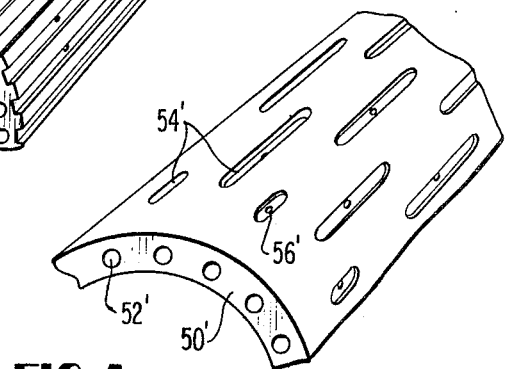
FIG. 4 is a partial perspective view showing the vacuum hold-down slots on the surface of the feed roller according to a second embodiment.

In a second embodiment as shown in FIG. 4, the grooves 54' in the outer surface of the cylindrical wall 50' are of random length and do not extend to the end of the cylindrical wall. One or more passages 56' communicate the interior of each bore 52' with one or more grooves 54' which are in alignment with that respective bore. If the photosensitive sheet 18 is wide enough to cover the entire length of one or more grooves 54', the stronger vacuum can be applied due to the fact that the ends of the grooves 54' are not opened to the atmosphere.

Figure 5:
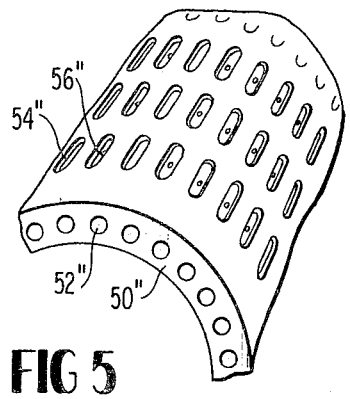
FIG. 5 is a partial perspective view showing the vacuum hold-down slots on the surface of a feed roller according to a third embodiment.
Figure 6:
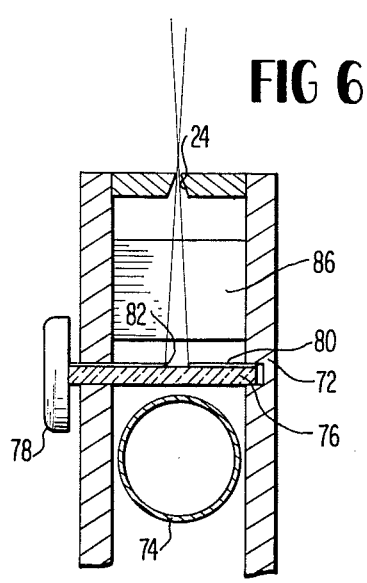
FIG. 6 is a detailed sectional view transversely of the elongated light source and the collimating arrangement associated therewith.

In the third embodiment as shown in FIG. 5, the grooves 54" are all of equal length and are disposed in even rows about the circumference of the cylindrical wall 50". The ends of the grooves 54" do not communicate with the end of the cylindrical wall 50" so that a stronger vacuum can be maintained if the photosensitive sheet covers the entire length of a particular groove. At least one passage 56" communicates the interior of a bore 52" with each groove 54" aligned with that particular bore.

Figure 9:
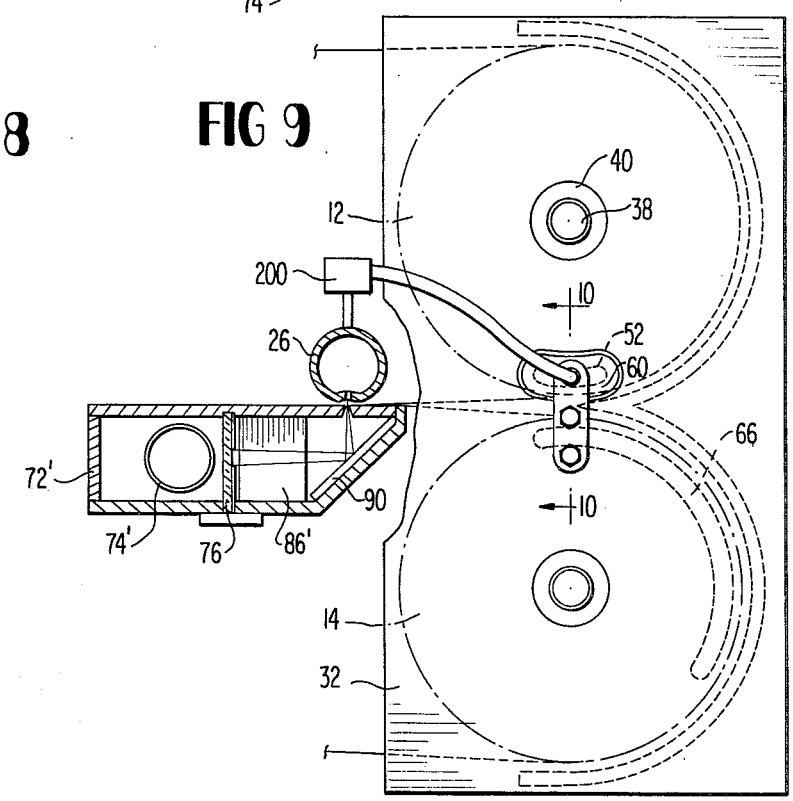
FIG. 9 is a side elevational view, partly in section, similar to FIG. 1 but showing a modified lighting arrangement.

In order to distribute a vacuum to one or more bores 52 in the roller 12, an arcuate shoe 60 is provided in intimate sliding contact or closely spaced relation with the end of the roller 12 which has the opened ends of the bores 52 located. The shoe 60 may be mounted on the housing 32 by means of bolts 62. The shoe 60 will protrude through a slot 64 in the wall 32 as best seen in FIG. 10. The vacuum shoe 60 which cooperates with the roller 12 is mounted at one end of the two rollers and the vacuum shoe 66 associated with the roller 14 is mounted at the opposite end to prevent interference between the two vacuum shoes. The vacuum shoe 66 is mounted similar to the vacuum shoe 60 but covers the greater angular extend of the circumference of the roller. As shown in FIG. 9, the vacuum shoe 66 extends slightly more than 90° and therefore is capable of drawing a vacuum on a larger number of bores than the vacuum shoe 60 which only applies the vacuum to three bores in the cylinder 12. The support housing 32 is provided with guide members 68 and 70 which are disposed in curved spaced relation to the circumference of the rollers 12 and 14 for approximately 180° with respect to each roller. Thus, when the photosensitive sheet and the copy material are released from the vacuum force holding them to the rollers 12 and 14, the photosensitive sheet and copy material will be guided by the curved surfaces 68 and 70 so that they will exit in a direction parallel to but opposite to the direction in which they passed over the light slit 24.

In addition to having the photosensitive sheet and copy material passed into intimate engagement with each other and the support surface 22 by means of a positive air pressure in the groove 28, it is necessary to have a collimated light beam directed through the light slit 24. In order to accomplish this, a light housing 72 is secured beneath the support surface 22 which extends substantially parallel to the light slit 24. An elongated light source 74 such as a fluorescent tube or the like is disposed at the bottom of the housing 72. Immediately above the light source 74 the divider 76 is provided which extends across the entire housing 72. The divider 72 may be removable and is provided with a handle 78 to assist in sliding the divider into and out of the housing 72. The divider 76 may be of transparent materials such as glass, plastic, or the like, and is provided with an opaque coating 80 on the upper surface thereof having an elongated slit of predetermined width formed therein which will allow a narrow beam of light from the light source 74 to pass upwardly to the light slit 24. The coating 80 with the slit 82 may be formed by photographic methods or any other suitable means.

Figure 7:
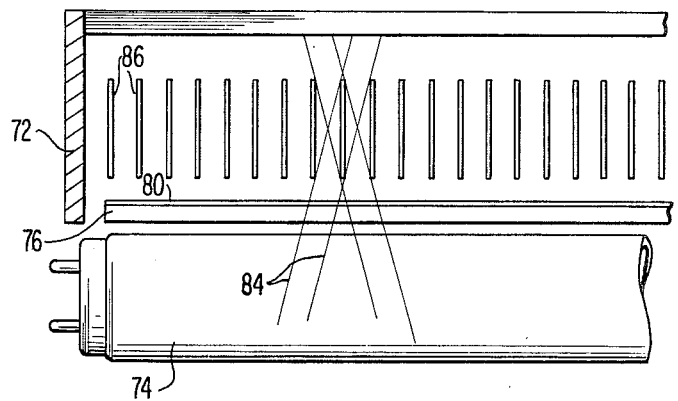
FIG. 7 is a side view, partly in section, of the arrangement shown in FIG. 6.
Figure 8:
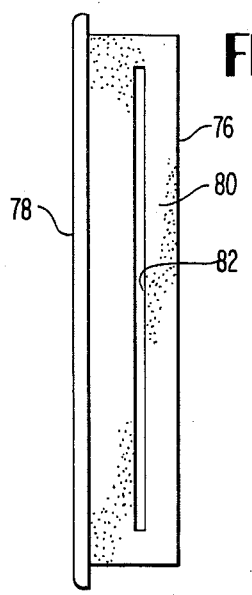
FIG. 8 is a plan view of the removable secondary light aperture plate.

In order to further collimate the light and prevent diagonal beams of light such as those indicated as 84 in FIG. 7 from striking the copy material 20 and the photosensitive sheet 18, a plurality of transverse baffles 86 are disposed in the housing 72 between the divider 76 and the light slit 24.

Depending upon the space available in the main housing of the optical distortion device, it might be desirable to dispose the light source 74', divider 76', baffles 86' and housing 72' horizontally as shown in FIG. 9. With this arrangement, it is only necessary to add a mirror 90 so as to direct the horizontal beam of light from the light source 74' vertically upwardly through the light slit.

Figure 11:
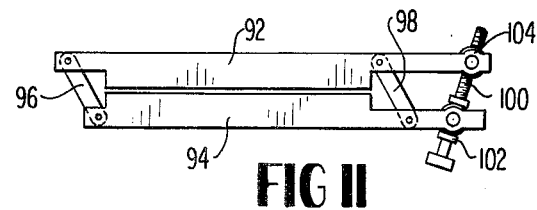
FIG. 11 is a plan view of a modified adjustable light aperture arrangement.

While the light slit 82 on the divider 76 is of a fixed width, a plurality of dividers can be provided having light slits of different widths thereon. Therefore it is only a simple matter of replacing one divider with another to achieve different lighting effects. It is also possible to provide an adjustable light slit by means of the mechanism shown in FIG. 11. A pair of plates 92 and 94 are spaced apart from each other to define a light slit therebetween. The ends of the light slits could be defined by a pair of fixed permanent baffles within the light housing. The two plates 92 and 94 are connected together by means of a pair of links 96 and 98 which are pivotally connected to the plates 92 and 94 to provide a parallelogram linkage. An elongated screw 100 is rotatably mounted in a first universal member 102 connected to the plate 94 and is threaded through an aperture in a second universal member 104 connected to the plate 92. Upon rotation of the screw 100, the plate 92 will be moved toward and away from the plate 94 to vary the width of the light slit therebetween.

In the operation of the optical distortion device as described above, the copy material 20 to be distorted and the photosensitive sheet 18 are superimposed upon each other and fed between the air pressure tube 26 in the light slit 24 so that the leading edges can be gripped by the vacuum present in a predetermined number of grooves on the surface of the rollers 12 and 14. If the copy material 20 and the photosensitive sheet do not have sufficient lead ends, it is possible to tape or otherwise secure the copy material and the photosensitive sheet to clear plastic strips to provide the necessary lead-in length.

The variable frequency motors for driving the two rollers 12 and 14 may be operated in the manner in which the variable frequency motors are operated in the previous Klann U.S. Pat. No. 3,967,894. Assuming the variable frequency source is of the type which is only able to reduce the frequency to cause the motor connected thereto to run at a lower speed than the motor which is connected directly to the 60-cycle voltage source, it must be determined whether the image is to be stretched or shrunk in the direction of movement. If it is necessary to stretch the image formed on the photosensitive sheet, it would be necessary to rotate the roller 12 faster than the roller 14 which controls the movement of the copy material. Therefore, to stretch the image, the operator would connect the motors so that the motor 42 for driving the roler 12 would be operated directly by the 60-cycle voltage. The other motor for operating the roller 14 would be operated at a predetermined frequency lower than 60-cycles so that the two sheets 18 and 20 will be pulled pass the light slit 24 at a predetermined differential range to produce an image on the photosensitive sheet which is elongated in the direction of movement. If the opposite effect is desired, the connections to the motors can be reversed as taught in the Klann patent.

In order to provide clear, accurate photographic prints, it is extremely important that the photosensitive sheet and copy be passed over the light slit as smoothly as possible and that the photosensitive sheet and copy material be pressed into close intimate engagement with the light slit. The use of the positive air pressure holding force provided by the tube 26 in conjunction with the vacuum applied to the grooves on the feed rollers to provide an extremely smooth, efficient operation. The same pump and motor 200 can be used for providing the negative pressure to the rollers 12 and 14 and the positive pressure to the tube 26. Any number of bores in the rollers 12 and 14 may have a vacuum applied thereto depending upon the length of the shoes 60 and 66.

While the invention as been particularly shown and described with reference to the preferred embodiment thereof, it will be understood by those in the art that the foregoing and other changes in form and in details may be made therein without departing from the spirit and scope of the invention.

What is claimed is:

1. A device for producing a print on a photosensitive sheet from a photographic image on a copy sheet with a predetermined change in one dimension comprising a frame, light source means mounted in said frame, a housing surrounding said light source means including a flat upper surface having an elongated light slit therein, positive air pressure means disposed above said slit in spaced parallel relation thereto for holding said sheet in superimposed relation against said upper surface as said sheet passed over said light slit, first and second roller means rotatably mounted in said frame with the axis thereof disposed parallel to each other and said elongated light slit and disposed in a plane perpendicular to the plane of said flat surface, each of said rollers having vacuum means for holding a respective one of said sheets to the surface of each roller and variable speed driving means for rotating said rollers to pull said sheets passed said light slit at the desired relative speed.

2. A device as set forth in claim 1, wherein each of said rollers is provided with a plurality of axially extending bores disposed in a cylindrical configuration adjacent the circumference of the roller, a plurality of longitudinal grooves in the surface of the roller parallel to the axis of the roller with each slot disposed radially outwardly of a respective bore, at least one passage interconnecting each bore with an aligned groove and vacuum distributor means disposed adjacent the end of each roller for simultaneously applying a vacuum to a plurality of bores in each roller.

3. A device as set forth in claim 2 wherein said vacuum distributor means for each roller is comprised of an arcuate shoe disposed in sliding engagement with the end of the roller adjacent the cylindrical surface, a groove formed in said shoe having an arcuate length sufficient to overlie the ends of a plurality of bores in said roller, an air pump means having conduit means connected to said vacuum distributor means and said positive pressure means.

4. A device as set forth in claim 1, further comprising arcuate reflector means disposed in spaced relation to the circumference of each roller and extending about approximately one-half the circumference thereof for guiding said sheets in directions substantially opposite to the direction said sheets pass over said light slit.

5. A device as set forth in claim 1, wherein said light source means is comprised of an elongated light bulb substantially co-extensive in length with said elongated light slit and further comprising a plurality of parallel baffles extending transversely of said light slit within said housing and elongated variable width light aperture means disposed parallel to said light source means intermediate with said light source means and said baffles to collimate the beam of light passing through said light slit.

6. A device as set forth in claim 5, wherein said variable width light aperture means is comprised of a plate having an elongated light aperture of a predetermined width thereon which is replaceable by other plates having different width light apertures.

7. A device as set forth in claim 5, wherein said variable width light aperture means is comprised of a pair of parallel plates mounted for movement toward and away from each other to define a light slit therebetween.

8. In a feed roller of the type having vacuum means on the surface thereof for holding a piece of sheet material thereto, the improvement comprising a plurality of parallel axially extending bores formed in a cylindrical configuration within said roller adjacent the circumference thereof, a plurality of grooves formed in the outer cylindrical surface of said roller parallel to and in radial alignment with each of said bores, at least one passage communicating each groove with a respective bore, said bores being closed at one end and vacuum distributor means disposed adjacent the opposite end of said roller for simultaneously applying a vacuum to a plurality of said bores, said distributor means being comprised of an arcuate shoe having vacuum passage means which cover a plurality of bores.

9. In a feed roller as set forth in claim 8, wherein said grooves extend the entire length of said roller with the ends thereof opened.

10. In a feed roller as set forth in claim 8, wherein said grooves are spaced inwardly from the ends of said roller with each groove having end walls so that a piece of sheet material overlying said groove completely will enhance the vacuum applied to that groove.

11. In a feed roller as set forth in claim 8, wherein a plurality of axially spaced grooves having end walls communicate with each bore and the grooves communicating with each bore are axially offset relative to the grooves communicating with an adjacent bore.

* * * * *